Feb. 12, 1952 N. S. SPENCER 2,585,595

INTERRUPTING CAPACITY CALCULATOR FOR LOW-VOLTAGE ALTERNATING CURRENT DISTRIBUTION SYSTEMS

Filed Oct. 14, 1950 2 SHEETS—SHEET 1

INVENTOR.
Nye S. Spencer
BY
Ostrolenk & Faber
ATTORNEYS

Feb. 12, 1952 N. S. SPENCER 2,585,595

INTERRUPTING CAPACITY CALCULATOR FOR LOW-VOLTAGE ALTERNATING CURRENT DISTRIBUTION SYSTEMS

Filed Oct. 14, 1950 2 SHEETS—SHEET 2

INVENTOR.
NYE S. SPENCER

BY Ostrolenk & Faber

ATTORNEYS

Patented Feb. 12, 1952 2,585,595

UNITED STATES PATENT OFFICE 2,585,595

INTERRUPTING CAPACITY CALCULATOR FOR LOW-VOLTAGE ALTERNATING CURRENT DISTRIBUTION SYSTEMS

Nye S. Spencer, Merion, Pa., assignor to I-T-E Circuit Breaker Company, Philadelphia, Pa., a corporation of Pennsylvania Application October 14, 1950, Serial No. 190,094

3 Claims. (Cl. 235—70)

Figures 1A, 1B, 1C:
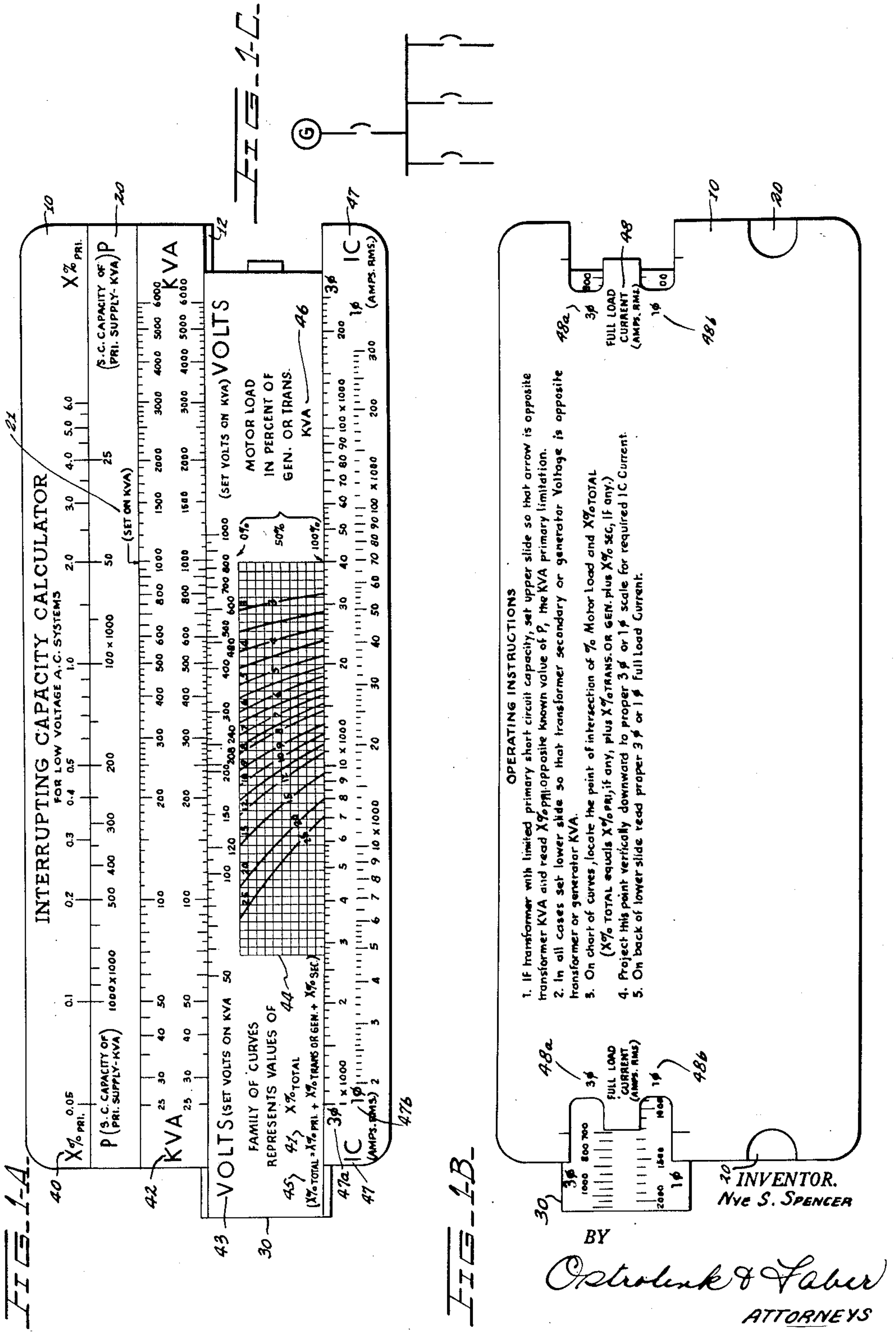

My invention relates to a novel slide rule calculator and in this specific case to a novel slide rule for making a quick calculation of the interrupting current capacity requirements of circuit breakers in a low voltage alternating current system.

The conventional slide rules and portable calculators are adapted with logarithmic scales for the mathematic operations of multiplication and division.

However, mathematical problems which involve the addition of functions are generally impossible to solve with calculators heretofore in use and, therefore, must be solved by longhand methods. In order to simplify and improve upon the longhand procedure, the slide rule calculator of the present invention was devised.

In alternating current systems it is necessary to know the magnitudes of currents which the circuit breakers in the system may be called upon to interrupt and the full load currents which such circuit breakers may be required to carry continuously without excessive heating. With such information, a proper selection of circuit breakers for a specific system may be made.

The generally accepted equation for calculating the symmetrical three-phase R. M. S. (root mean square) interrupting current capacity in a simple low voltage A. C. system contains five independent variable and involves not only the addition of two terms but also addition within the denominator of one of the terms.

Thus, the specific problem consists in solving for a first multi-variable formula consisting of addition of terms, addition of variables within one term and at the same time solving for a second equation. These obstacles are overcome in the slide rule calculator of this invention by the combined use of a graph of "family of curves" and a special slide rule scale, the graph moving with respect to the logarithmic scales of the rule.

Accordingly, it is an object of my invention to provide a calculator or slide rule which incorporates a "family of curves" combined with logarithmic scales.

It is a further object of my invention to provide a calculator for solution of problems to determine in the same calculation the maximum interrupting current capacity and the maximum full load current magnitude for which each circuit breaker should be designed.

It is a still further object of my invention to provide a calculator to solve algebraic equations which involve the addition of terms as well as the operations of multiplication and division.

Still another object of my invention is to provide a novel slide rule for solution of equations which contains five independent variables and involves not only the addition of two terms but also addition within the denominator of one of the terms.

It is a still further object of my invention to provide an interrupting capacity calculator for solution of single-phase and three-phase problems.

Still another object of my invention is to provide a calculator consisting of a "family of curves" combined with logarithmic scales to solve the specific problem at hand and to provide a new approach to the slide rule solution of many other types of problems which presently are not adapted to logarithmic scales.

Ohter objects and features of the invention will be readily apparent to those skilled in the art from the following description and drawings illustrating the invention in which:

Figure 1–A illustrates a front view of the interrupting current calculator with the lower slide positioned for solution of a specific problem which has a generator source.

Figure 1–B shows the reverse side back view of the calculator of Figure 1–A.

Figure 1–C shows the circuit system of the problem for which Figures 1–A and 1–B are positioned.

Figures 2A, 2B, 2C:
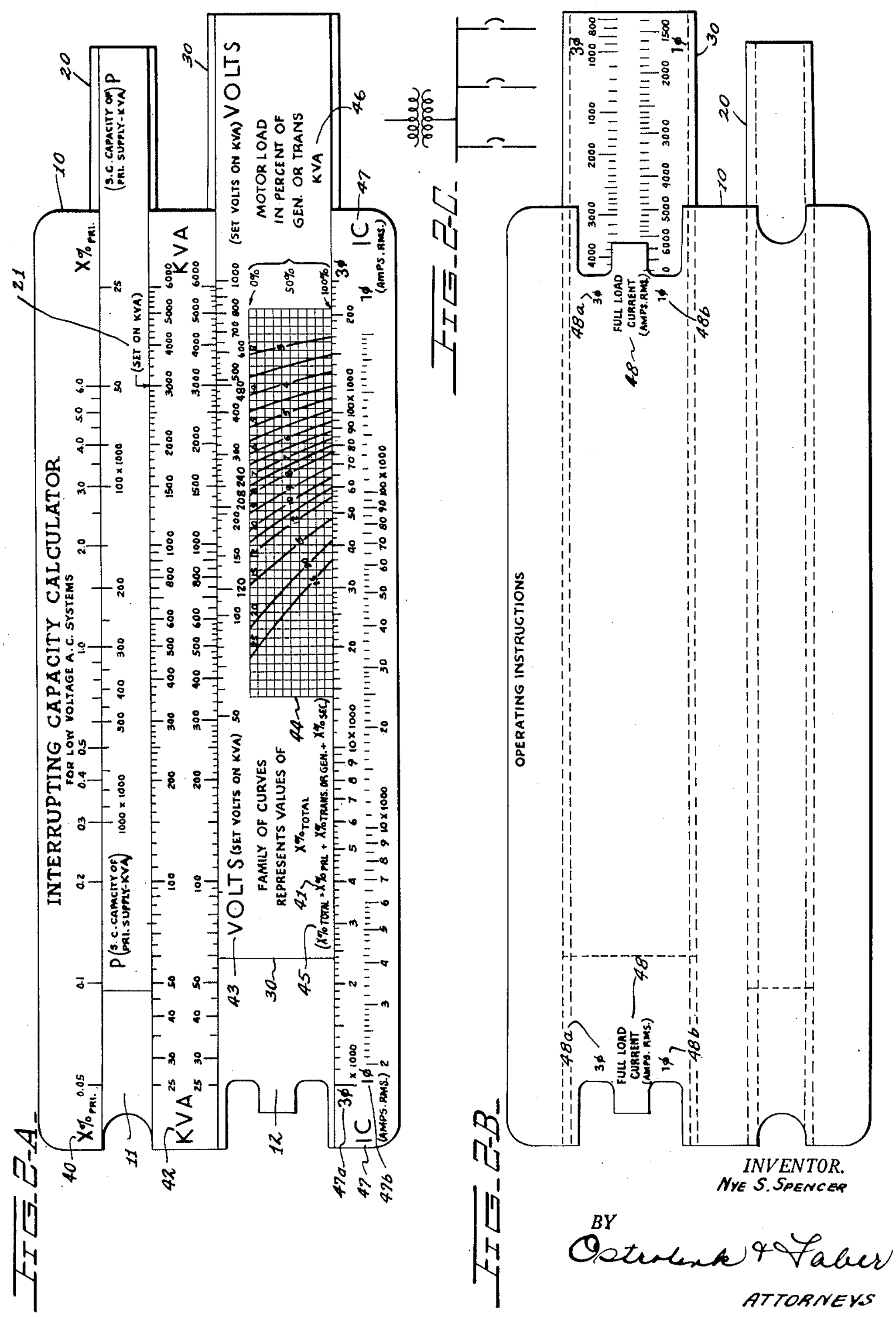

Figure 2–A illustrates a front view of the interrupter capacity calculator with the upper and lower slides positioned for a solution of a specific problem which has a transformer source.

Figure 2–B illustrates the reverse side back view of the calculator of Figure 2–A.

Figure 2–C illustrates the circuit system of the problem for which the calculator of Figure 1–A is positioned.

The general empirical equation used for calculating the symmetrical three phase R. M. S. interrupting current capacity of a circuit-breaker in simple low voltage A. C. systems is:

$$IC_{3\phi}=1.25\left[\frac{100\times 1000\text{ kva. source}}{\left(X\%+\frac{100}{P.}\text{kva. source}\right)\sqrt{3}E}+4\,\frac{1000\text{ kva. of motors}}{\sqrt{3}E}\right]$$

The first term of this equation within the brackets accounts for the short circuit current contributed by the source or sources of power in the system and the second term of the equation within the brackets accounts for the additional short circuit current contributed by the motors involved in the system which if connected to the system at the time of fault current occurrence would substantially act as generators for a short period of time. The factor "4" represents the reciprocal of the average per unit reactance of low voltage motors—based on the conventionally assumed division of motor load of 75% induction and 25% synchronous.

The equation for calculating full load three phase current of a circuit breaker in an A. C. system is $$I_{fl}=\frac{1000 \text{ kva. source}}{\sqrt{3}E}$$

The symbols used in these equations, similar to those used on the scales of the calculator, have the following meaning:

$IC_{3\phi}$=a symmetrical three phase R. M. S. interrupting current including D. C. component and A. C. decrement and is the average current in the three phases at an instant one-half cycle after the fault occurs.

Kva. source=kva. rating of the generators or transformers feeding the system.

X%=per cent reactance of the generator plus per cent reactance of secondary conductors to the fault (if appreciable).

P=short circuit capacity in kva. of the primary circuit supplying the transformer, in cases where the source of kva. is a transformer.

E=line-to-line voltage in volts.

Kva. motors=motor load in kva. connected to the system.

1.25=time decrement factor conventionally adapted for low voltage A. C. systems and their associated 2-4 cycle breakers to account for the D. C. component.

The following method of solution will illustrate the conventional longhand use of this interrupting current capacity equation for a typical low voltage alternating current problem.

*Problem 1*

System—3 phase, 3 wire
Transformer, 3000 kva.
Volts, 6900/480 volts
Transformer reactance, 6%
Motor load, 100% of transformer kva.
Kva. short circuit capacity of the transformer primary supply (P) equal 250,000 kva.

The problem is to find interrupting current capacity requirements of the circuit breaker.

The numerator of the first term is $$100\times1000 \text{ kva. source}=100\times1000\times3000=3\times10^8$$

The denominator of this first term $$\left(X\%+\frac{100}{P}\text{ kva. source}\right)\sqrt{3}E=\left(6+\frac{100}{250{,}000}\times 3000\right)\times\sqrt{3}\ 480=5980$$

The division of numerator ($3\times10^8$) by the denominator (5980) gives a result for the first term of 50,170.

The numerator of the second term $$4\times1000\times\text{kva. motor equals } 4\times1000\times3000 \text{ equals } 12\times10^6$$

The denominator of this second term $$\sqrt{3}\,E \text{ equals } \sqrt{3}\times480 \text{ equals } 830$$

The division of the numerator ($12\times10^6$) by the denominator of (830) equals 14.500.

The addition of the first term (50,170) and the second term (14,500) is 64,670. When this number (64,670) is multiplied by the time decrement of 1.25 gives the solution of 80,838 amperes which is the interrupting current requirement of the circuit breaker for Problem 1.

The notations or symbols which appear on the interrupting current calculator to indicate the various scales as noted in Figures 1–A and 2–A have the following meaning and henceforth the scales will be referred to by their symbols:

"K%pri" (41)= reactance of primary system in per cent. Used only in cases where the source kva. is a transformer.

"Kva." (42)=kva. of a source generator or transformer, as the case may be.

"Volts" (43)=line-to-line voltage.

"X% total" (45)=

X%pri+X% trans. or gen.+X% sec.

"X%pri"=same as noted above.

"X% trans. or gen."=per cent reactance of the generator or transformer.

"X% sec."=per cent reactance of the secondary conductors from source to fault (if appreciable).

"% motor load" (46)=the motor load in per cent of generator or transformer kva. and is the ordinate of the family of curves.

"IC" (47)=interrupting current in amperes R. M. S.

There is one scale on the calculator for three-phase systems indicated by $IC_{3\phi}$ (**47*a*) and one scale for one-phase systems indicated by $IC_{1\phi}$ (47*b***).

The construction of the calculator will be described with reference to Figures 1–A and 2–A. The base or fixed frame 10 is of flat rectangular construction made of plastic, metal, wood, or any other suitable material. The front of base 10 is provided with two longitudinal rectangular grooves 11 and 12. A first longitudinal sliding element 20 is slidably mounted in groove 11 of base 10 and a second main longitudinal sliding element 30 is slidably mounted in groove 12 of base 10.

The four logarithmic scales of "X%pri" 40, "kva." 42, "$IC_{3\phi}$" **47*a* and "$IC_{1\phi}$" 47*b* are all located on the front of the base or fixed frame 10** of the calculator as noted in Figures 1–A and 2–A.

All calculations are made on this front side of the calculator. The logarithmic scale of "P" is located on front of the sliding element 20. An arrow marked "set on kva." 21 is also located on this front side of the slide 20. The back side of slide 20 does not contain any scales. The slide 20 is used only as a supplementary scale in those instances where the source under consideration is a transformer which has a primary supply of "limited" short circuit kva. capacity.

The principal sliding element 30 basically solves all types of circuit breaker interrupting current capacity problems. This front side of slide 30 contains the "volts" scale and also the "family of curves" scale (44). The reverse or back side of the slide 30 contains the scales on which the full load current (amperes R. M. S.) 48 for either one phase **48*b* or three plase 48*a* are obtained. These "full load current" scales 48** are seen in Figures 1–A and 2–A.

The "family of curves" 44 can be seen on the slide 30 in Figures 1–A and 2–A. This family of curves 44 is graphically indicative of the various constant values of per cent total reactance (X% total 45=X%pri 41+ X% trans. or gen.+X% sec.)

The ordinate of these curves is the "motor load in per cent of generator or transformer Kva." 46 with the upper limit of the graph as 0% and increasing downwardly to 100% of the generator or transformer kva.

The abscissa of the family of curves is not volts or any other specific value but is an arbitrary (numerical value) factor, in this case a binomial, which is the residue of the general formula after its reduction to its simplest form—i. e.

$$IC1.25\times\frac{100\times 1000\text{ kva. source}}{X\%\text{ total }\sqrt{3}E}=4\times\frac{1000\text{ kva. motors}}{\sqrt{3}E}$$

$$1.25\times\frac{1000}{X\sqrt{3}E}=4\times\frac{25\text{ kva. source}}{X\%\text{ total}}=\text{kva. motors}$$

Note bottom slide scale with "family of curves" used "X% total" hence eliminating the "P" factor. Also the ordinate item on "family of curves" is "percent motor kva. load to source kva." and not just "motor kva."

Hence, temporarily, for a given percent motor load such as 100%:

$$IC\frac{5000}{\sqrt{3}E}=\frac{25\text{ kva. source}}{X\%\text{ total}}=\frac{\text{kva. source}}{\text{kva. source}}=\text{kva. motors}$$

$$\frac{5000}{\sqrt{3}E}=\text{kva. source}=\frac{25}{X\%\text{ total}}=\frac{\text{kva. motors}}{\text{kva. source}}$$

$$\frac{5000}{\sqrt{3}E}=\text{kva. source}=\frac{25}{X\%\text{ total}}=1.0$$

For a given selection of desired values of X% total, the bracketed binomial above can be reduced to an equivalent series of actual numerical values. This series of values, therefore, represents the plot of reactance points across the 100% motor load line on an actual logarithmic scale. For any one point the numerical value can be combined with the $$\frac{5000}{\sqrt{3}}$$

to reduce the formula to a simple numerical value times *E* times kva. source. The positioning of the IC scale is arranged so as to give final answer directly when the slide is positioned with E adjacent to kva.

Similarly, for each their value of percent motor load the binomial can be determined and the selection of desired values of X% total substituted in turn to reduce to an equivalent series of actual numerical values which can be plotted on this actual log scale. In this progressive fashion the "family of curves" can be plotted and on this, in effect, a point can easily be located which represents the numerical value of the binomial for these two particular values of the independent variables X% total and percent motor load.

The actual log scale for these numerical values (abscissa) is not printed for the observer because it need not be known and the scales are properly fixed in relation to each other, the final answer being all that need be known. As a matter of fact, a blue background cross hatching is printed in behind the "family of curves" to aid one in projecting downward a given point to the IC scale. This blue marking might be believed to be a linear scale of some meaning but it is merely a guide to the eye.

It will be observed that the positioning of the "volts" scale 43 with respect to the "kva." scale 42 will automatically position the family of curves 44 with respect to the "IC" scale 47. Herein lies the invention of this application. That is, the positioning of two logarithmic scales, "kva." 42 and "volts" 43 with respect to one another also positions the "family of curves" 44 with respect to the logarithmic scale of "IC" 47, where the answer read on the "IC" scale is the interrupting current rating required of the circuit breaker.

The given information of "motor load in per cent of generator or transformer kva. 46" and "per cent reactance 45" of the problem enables the user of the calculator to locate a point on the "family of curves" 44 and by visual vertical projection downwardly will be able to read the interrupting current capacity on the "IC" scale 47 of the base 10. Thus, use of logarithmic scales to position the "family of curves" 44 enables the calculator to solve the present problem whose equation involves the addition of functions.

It is believed that the above will explain how the use of a "family of curves" enables a plot of a combined factor which includes two independent variables—just as readily with an addition or subtraction of terms as with multiplication or division and also with even two or three or four times within the brackets as well as one or two, as long as there are only two unknowns within the brackets. In this way the choice of two unknowns on the graph reduces to a specific numerical value which is combined with the other term. Such a scheme also makes possible the solution of a problem involving four independent unknowns with one setting of a sliding scale as well as the solution of a problem which involves addition or subtraction.

Obviously, from the foregoing the scheme described is based on a mathematical concept regarding the solution of problems, and is not unique to the specific problem of interrupting capacities of circuit breakers. It could more generally be stated that most any formula such as follows could be arranged for one-step solution on such a device even though addition or subtraction is involved.

$$*\ X=m\frac{A}{B}\left[\frac{K}{C}+D\right]$$

$$**\ X=m\frac{A}{B}[KC+pD+g]\text{ etc.}$$

Note that * equation is similar to one used with I. C. problems.

** equation illustrates that dissimilar mathematical functions may be solved in the same general way.

A typical problem and the calculator procedure for solution, in the instances where the source of a three-phase system is a generator or transformer of "unlimited" primary capacity, is given below and is illustrated in Figures 1–A and 2–A.

*Problem 2*

A system as seen in Figure 1-C of three-phase and 3 wires.

Generator—250 kva.

Volts, 120/208

Motor load, 50% of generator kva.

Generator reactance, 15% X

The problem is now to find the interrupting current of the circuit breaker and full load current of the system. The procedure for solution is outlined in the following steps and refer to Figures 1–A and 1–B:

1. Set the sliding element 30 so that the line-to-line voltage of 208 volts on "volts" scale 43 is opposite the generator 250 kva. on the "kva." scale 42.

2. Locate the point on the "family of curves" 44 which represents the intersection of the known information of 50% motor load on the ordinate and the 15% generator reactance graph line.

3. Read the interrupting capacity current of 7500 in R. M. S. amperes on the three-phase line of the logarithmic "IC" scale 47*a* vertically under the point found in the preceding step (Figure 1–A).

4. Read the full load current of 695 in R. M. S. amperes on the three-phase line of the full load current logarithmic scale 48*a* on the reverse side of the lower sliding element 30 (see Figure 1–B).

It will be noted that by means of the "family of curves" the solution of the circuit breaker interrupting requirement problem involving four independent variables and the calculation of the full load current are both accomplished with only one setting of the slide rule.

Figure 2–A illustrates the use of the calculator in the following problem where the source is a transformer or "limited" primary capacity and is similar to Problem 1.

*Problem 3*

This problem refers to a three-phase, 3 wire system and the circuit is illustrated in Figure 2–C.

Transformer—300 kva.
Volts—6900/480 volts
Transformer reactance, 6% X
Motor load, 100% of the transformer kva.
Kva. short circuit capacity of the primary supply (P=250,000 kva.)

The problem is to find the interrupting current requirement of the secondary circuit breakers and full load current of the system. Referring to Figures 2–A and 2–B, the steps are outlined below:

1. Set the sliding element 30 so that the line-to-line secondary voltage of 480 volts on the "volts" scale 43 is opposite the transformer 3000 kva. on the "kva." scale 42 of the base 10.

2. Set the first sliding element 20 so that the arrow marked "set on kva." 21 is pointing to the transformers 3000 kva. on the "kva." scale 42 of the base.

3. Read the per cent primary reactance of 1.2% on the "X%pri" scale 40 of the base opposite 250,000 kva. short circuit capacity on the "P" scale 41 of the slide element 20.

4. Add mentally this X%pri (1.2%) of the transformer per cent reactance X% trans. (6.0%) to get the X% total (7.2%) of the system.

5. Locate the point on the "family of curves" 44 which represents the intersection of the information 100% motor load on the ordinate and 7.2% total reactance interpolated between the 7% and 7.5% curves.

6. Read the circuit breaker interrupting current capacity of 81,000 R. M. A. amperes on the three-phase "IC" scale 47*a* on the base 10.

7. Read the full load current of 3600 R. M. S. amperes on the three-phase scale 48*a* located on the back of the sliding element 30 as noted in Figure 2–B.

As with the previous problem, the selection of the proper size and type circuit breaker for this system can now be made from the table of "I–T–E Low Voltage Circuit Breakers" shown on back of the rule.

It will be noted that the solution of this circuit breaker interrupting current problem with five independent variables and addition of functions, and the calculation of full load current are both accomplished with only two initial settings of the rule.

The problem of Examples 2 and 3 were worked out for a three-phase system. If it is desired to find the circuit breaker interrupting current capacity and the full load current of a one-phase two-wire system, the answer would be found on the one-phase "IC" 47*b* of the base 10 and the one-phase full load current scale 48*b* on the back of the sliding element 30, respectively.

The calculator applications are not limited to the preceding type of operation. An example of further application is given below.

*Problem 4*

Circuit breaker "A" has an interrupting capacity rating of 75,000 amperes and circuit breaker "B" has an interrupting capacity rating of 100,000 amperes. The solution of Problem 3 indicates that the electrical system requires the larger circuit breaker "B." If it is desired not to use the larger circuit breaker "B," one could work backwards on the calculator to redesign the system to have a circuit breaker interrupting current capacity of 75,000 amperes so that the smaller circuit breaker "A" could be used.

Thus, Problem 4 could be solved as follows:

With the slide 30 positioned so that the "family of curves" 44 are in the position of Problem 3 and Figure 2–A, and the 75,000 ampere interrupting capacity located on the "IC" scale 47*a*, desirable circuit design conditions may be determined from a vertical projection of this marking onto the "family of curves" 44.

Typical examples that could be determined, as seen in Figure 2–A, would be 70% motor load at 7.2%, total reactance, or 100% motor load at 8.0% total reactance, or any other intermediate combination of conditions could achieve such desired limitations for Problem 4.

The sliding element 20 can also be used backwards to indicate primary limitations. It will be noted that both of these "backward" procedures can be accomplished with the original setting of the rule.

Not only is it possible to work backwards to arrive at optimum conditions but it is also possible to "cruise" back and forth on the "family of curves" 44 through ranges of motor loads and ranges of per cent reactance and visualize the resulting effects on the interrupting capacity. The slopes of the curves and the distances between curves aids this visual analysis considerably.

This visualization of effects over ranges of conditions is all possible with single settings of the scales; hence, an infinite number of problems are, in effect, solved simultaneously.

Features of the calculator are summarized as follows:

1. The operator may determine the interrupting capacity with a minimum number of steps.

2. The calculator can be used with or without a knowledge of how the actual calculations are made and what formulae are used.

3. The calculator may be used to solve for full load current and the interrupting capacity current simultaneously.

4. The calculator is designed so as to solve for both one-phase and three-phase problems directly.

5. The calculator is adaptable to solve problems involving generators or transformers of any design and with any given value of reactance.

6. The calculator is arranged for possible interpolation of all terms involved.

7. The use of the "family of curves" effectively performs an addition of terms on the slide rule.

8. The use of the "family of curves" condenses four independent variables into one setting on the rule.

9. The use of the "family of curves" also makes possible a visual analysis of the application problem with a single setting of the rule.

10. The slides are arranged independently so as to permit coordinated operation.

The calculator has been made in a slide rule form because that was conceived to be the neatest, most useful and compact arrangement. It is believed that the notion combining a "family of curves" and a logarithmic slide rule fulfills the desired requirement more simply and more completely than any known existing device and achieves a solution to problems not otherwise adaptable to simple logarithmic scales. It should be noted that a calculator of a "family of curves" combined with a slide rule could be worked out for use on high voltage interrupting capacity problems.

Further, it should be noted that a similar calculator combining the "family of curves" with logarithmic scales could be worked out for many assorted problems involving formulae with four or five independent variables and the addition of various terms as well as multiplication and division.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A calculator comprising a base, a longitudinal slide mounted and longitudinally slidable with respect to said base, a first logarithmic scale on said slide adjacent one longitudinal edge thereof; a family of curves extending in a generally transverse direction across said slide and terminating adjacent the opposite longitudinal edge of said slide; a second logarithmic scale on said base adjacent the first-mentioned longitudinal edge of said slide; a third logarithmic scale on said base adjacent the second-mentioned edge of said slide, said slide being movable to a position where selected portions of said first and second logarithmic scales are in register; said family of curves then registering with related portions of the third logarithmic scale related to the registered portions of the first and second logarithmic scales, additional transverse and longitudinal lines on said sliding element, said transverse lines interrupting said family of curves and extending to said third scale, said longitudinal lines interrupting said family of curves and said transverse lines, and a fourth logarithmic scale on the reverse side of said slide presenting a reading in response to the registering of said first and second logarithmic scales.

2. An interrupting capacity calculator for low voltage A. C. systems, comprising a base, a longitudinal slide mounted and longitudinally slidable with respect to said base, a "volts" scale on said slide adjacent the upper longitudinal edge thereof, a family of curves representing a plot of two variables for many values of constant numbers, the variable of the ordinate being "motor load in per cent of generator or transformer kva." and the variable of the abscissa being the constant numbers representing the values of total reactance, a "kva." scale on said base adjacent the first-mentioned longitudinal edge and "volts" scale of said sliding element, and an "interrupting capacity" scale on said base adjacent the lower longitudinal edge of said slide; said slide being movable to a position where selected portions of the "volts" and "kva." scales are in register, said family of curves then registering with related portions of the "interrupting capacity" scale related to the registered portions of the "volts" and "kva." scales, said calculator having a "full load current" scale adjustable simultaneously with the said slide on the reverse side of said slide; and a marker on said calculator for reading said "full load current" scale.

3. An interrupting capacity calculator for low voltage A. C. systems, comprising a base, a longitudinal slide mounted and longitudinally slidable with respect to said base, a "volts" scale on said slide adjacent the upper longitudinal edge thereof, a family of curves representing a plot of two variables for many values of constant numbers, the variable of the ordinate being "motor load in per cent of generator or transformer kva." and the variable of the abscissa being the constant numbers representing the values of total reactance, a "kva." scale on said base adjacent the first-mentioned longitudinal edge and "volts" scale of said sliding element, and an "interrupting capacity" scale on said base adjacent the lower longitudinal edge of said slide; said slide being movable to a position where selected portions of the "volts" and "kva." scales are in register, said family of curves then registering with related portions of the "interrupting capacity" scale related to the registered portions of the "volts" and "kva." scales, said calculator having a "full load current" scale adjustable simultaneously with the said slide on the reverse side of said slide; and a marker on said calculator for reading said "full load current" scale, and another longitudinal slide mounted and longitudinally slidable with respect to said base having a logarithmic scale, said last mentioned scale being a "short circuit capacity of primary supply in kva." scale which is utilized when said primary supply is a transformer of limited short circuit kva. capacity.

NYE S. SPENCER.

REFERENCES CITED

The following references are of record in the file of this patent:

UNITED STATES PATENTS

| Number | Name | Date |
|---|---|---|
| 1,382,011 | O'Neil et al. | June 21, 1921 |

FOREIGN PATENTS

| Number | Country | Date |
|---|---|---|
| 359,573 | Italy | May 30, 1938 |